US005726230A

United States Patent [19]
Murata et al.

[11] Patent Number: 5,726,230
[45] Date of Patent: Mar. 10, 1998

[54] AQUEOUS COATING COMPOSITION

[75] Inventors: Masahiro Murata, Atsugi; Toshio Kurihara, Hiratsuka; Akira Suehiro, Tokyo-to; Syuichi Ikenoue, Amagasaki, all of Japan

[73] Assignee: Kansai Paint Company, Limited, Amagasaki, Japan

[21] Appl. No.: 546,563

[22] Filed: Oct. 20, 1995

[51] Int. Cl.$^6$ ....................................................... C08K 5/10
[52] U.S. Cl. ........................ 524/308; 523/403; 523/409; 523/412
[58] Field of Search ........................... 524/308; 523/403, 523/409, 412

[56] References Cited

U.S. PATENT DOCUMENTS 5,069,956 12/1991 Murata et al. ..................... 428/216
5,399,357 3/1995 Akiyama et al. ..................... 424/457

FOREIGN PATENT DOCUMENTS 7-138501 5/1995 Japan.

Primary Examiner—Vasu Jagannathan
Assistant Examiner—John J. Guarriello
Attorney, Agent, or Firm—Armstrong, Westerman, Hattori, McLeland & Naughton

[57] ABSTRACT

Disclosed is an aqueous coating composition which comprises a water-dispersible resin and an ester of a polyglycerin ether with a fatty acid.

8 Claims, No Drawings

AQUEOUS COATING COMPOSITION

The present invention relates to a novel aqueous coating composition containing an ester of a polyglycerin ether with a fatty acid which contributes to the improvement of the lubricity and processability of the coating.

Conventionally, in the manufacture of cans (for foods, beverages, etc.), crown caps and the like, generally a sheet metal has been coated with a coating composition, and the coated sheet metal has been subjected to shaping operations such as drawing, stamping, seaming, folding and the like. From the viewpoints of prevention of environmental pollution, savings of resources, safety, hygiene and so on, aqueous coating compositions containing water as a main dispersing medium are now increasingly used for coating cans or the like in place of organic solvent coating compositions.

In the coating process, a lubricated coating surface is formed due to a wax incorporated in the aqueous coating composition which serves to avoid mars, cracking, flaking or the like in shaping operations. While it is known that the wax in the aqueous coating composition can reduce the frictional resistance on the coated surface and can enhance the shapeability of the sheet metal, the techniques for adding the wax to aqueous coating compositions have not been fully researched and various problems have been suggested. Consequently now the elimination of the problems is desired particularly in view of increasing use of aqueous coating compositions.

Generally a wax has been added to an aqueous coating composition in the form of an emulsion prepared by dispersing a particulate wax into water using a surfactant or the like as an emulsifier, or in the form of an aqueous solution or aqueous dispersion of a modified wax prepared by neutralizing a hydrophilic group (such as carboxyl group) introduced in the wax.

However, problems arise from the aqueous coating compositions having the wax incorporated therein by such methods. Since the particulate wax is present as separated from the particulate resin in the aqueous coating composition, the particulate wax hinders the uniform fusion-bonding of the resin in the course of forming a coating film. This makes it difficult to form a continuously fusion-bonded coating from the resin, resulting in coating with impaired physical properties. Moreover, the particulate wax may become agglomerated during the storage of coating compositions, leading to flaws of coating, e.g. cissing, cratering, etc. In the case of conspicuous agglomeration, a phase separation may occur between the particulate wax and the composition. Further, a surfactant abundantly present in the aqueous coating composition is likely to degrade the properties of the coating such as adhesion, water resistance, processability and weatherability. Since an emulsifier is inherently soluble in water, a further disadvantage is that when the coating composition has been used to coat the interior of a can, the emulsifier in the coating dissolves out into the contents of the can, raising problems of impaired hygienic quality and flavor quality.

It is an object of the present invention to provide a novel aqueous coating composition free of the foregoing prior art problems.

It is another object of the invention to provide a novel aqueous coating composition which is excellent in the properties of the coating such as lubricity, processability, appearance, etc. and in the properties of the composition such as antifoaming property, stability, etc.

These and other objects of the invention will become more apparent from the following description.

According to the present invention, there is provided an aqueous coating composition which comprises a water-dispersible resin and an ester of a polyglycerin ether with a fatty acid.

The inventor of the present invention carried out extensive research to overcome the foregoing problems and found that the desired coating composition can be prepared from a water-dispersible resin and an ester of a polyglycerin ether with a fatty acid. The present invention has been accomplished based on this finding.

The aqueous coating composition of the invention comprises a particulate water-dispersible resin as a vehicle component stably dispersed in an aqueous medium and an ester of a polyglycerin ether with a fatty acid dissolved or dispersed therein. The aqueous composition of the invention can be thermoplastic or thermosetting.

The water-dispersible resin for use in the invention has a hydrophilic functional group(s) in the skeleton. Typical hydrophilic functional groups are a carboxyl group, sulfonic acid group, phosphoric acid group, boric acid group, hydroxyl group, ether group, etc. The resin can be rendered dispersible in water by itself or by neutralizing the functional group with a basic compound. Such water-dispersible resins to be used herein include those prepared by a process per se known using a compound having the above functional group, such as polyester resins, alkyd resins, acrylic resins, epoxy resins, graft reaction products of epoxy resins with carboxyl-containing acrylic resins, unneutralized resins such as polybutadiene, resins prepared by neutralizing the functional group in the unneutralized resin using the basic compound, etc. These resins can be used either alone or in combination.

Basic compounds useful in neutralizing the functional group are, for example, alkali metal compounds, ammonia, primary, secondary or tertiary alkylamines, aliphatic amines, alkanolamines, alicyclic amines, etc.

Among the above-mentioned water-dispersible resins, graft reaction products of epoxy resins, particularly aromatic epoxy resins with carboxyl-containing acrylic resins are suitable for use. The graft reaction product can be prepared, for example, by the following methods.

(I) An aromatic epoxy resin (A) and a carboxyl-containing acrylic resin (B) are subjected to an ester addition reaction in an organic solvent solution in the presence of an esterification catalyst such as a tertiary amine, ammonia, etc.

(II) The aromatic epoxy resin (A) and a monomer such as a carboxyl-containing radically polymerizable unsaturated monomer are subjected to graft polymerization in an organic solvent solution in the presence of a radical generating agent such as benzoyl peroxide.

Examples of the aromatic epoxy resin (A) for use herein are those prepared by condensing epichlorohydrin and bisphenol in the presence of an alkali catalyst to give a polymer, those prepared by subjecting a low molecular weight bisphenol type epoxy resin and a bisphenol compound to polyaddition reaction, those prepared by esterifying a low molecular weight bisphenol type epoxy resin and a dibasic acid to give an epoxy ester resin, etc. Suitable dibasic acids are compounds represented by the formula

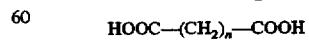

wherein n is an integer of 1 to 12. Specific examples are succinic acid, adipic acid, pimelic acid, azelaic acid, sebacic acid, dodecanoic acid, hexahydrophthalic acid, etc.

The low molecular weight bisphenol type epoxy resin to be used herein has an epoxy equivalent of about 140 to about 4,000. Examples of these epoxy resins are bisphenol A type epoxy resins, bisphenol F type epoxy resins, novolak type epoxy resins, and modified epoxy resins prepared by reacting these epoxy resins with acrylic or methacrylic acid, polycarboxylic acid, anhydrides thereof, fatty acid, polyether polyol, polyester polyol, polyamideamine, lactone or the like. Examples of bisphenol type epoxy resins commercially available are Epikote 828 EL, Epikote 807P, Epikote 1001, Epikote 1004 and Epikote 1007 (products of Yuka Shell Epoxy Co., Ltd.), Araldite GY 250, Araldite GY 260, Araldite 6084, Araldite 7097 and Aaldite 6097 (products of Ciba-Geigy AG.), Epomic R130, Epomic R140, Epomic R302, Epomic R304 and Epomic R307 (products of Mitsui Petrochemical Industries, Ltd.), etc.

Examples of useful bisphenol compounds are bis(4-hydroxyphenyl)-2,2-propane, 4,4'-dihydroxybenzophenone, bis(4-hydroxyphenyl)-1,1-ethane, bis(4-hydroxyphenyl)-methane, bis(4-hydroxyphenyl)-1,1-isobutane, bis(4-hydroxy-tert-butyl-phenyl)-2,2-propane, bis(2-hydroxynaphthyl)-methane, 1,5-dihydroxynaphthalene, bis(2,4-dihydroxyphenyl)-methane, tetra(4-hydroxyphenyl)-1,1,2,2-ethane, 4,4'-dihydroxydiphenylsulfone, etc. Among them, bis(4-hydroxyphenyl)-2,2-propane and bis(4-hydroxyphenyl)-methane are preferred. These bisphenol compounds can be used either alone or in combination.

Examples of the aromatic epoxy resin (A) commercially available are Epikote 1004 (about 900 in epoxy equivalent and about 1,400 in number average molecular weight), Epikote 1007 (about 1,700 in epoxy equivalent and about 2,900 in number average molecular weight), Epikote 1009 (about 3,500 in epoxy equivalent and about 3,750 in number average molecular weight), Epikote 1010 (about 4,500 in epoxy equivalent and about 5,500 in number average molecular weight), etc.

The number of epoxy groups per molecule of the aromatic epoxy resin (A) is not specifically limited. In preparing a graft reaction product of the epoxy resin and the carboxyl-containing acrylic resin, the number of epoxy groups is suitably selected according to the mode of the reaction. In the case of the ester addition reaction (I) as stated above, the average number of epoxy groups is 0.5 to 2, preferably 0.5 to 1.6, per molecule of the epoxy resin. In the case of the graft polymerization (II) of the acrylic monomer including carboxyl-containing acrylic monomers due to the removal of hydrogen atom from the main chain of the epoxy resin, the epoxy resin may contain substantially no epoxy group.

A suitable epoxy equivalent of the aromatic epoxy resin (A) is about 900 to about 22,000, preferably about 2,400 to about 14,000. The aromatic epoxy resin (A) having an epoxy equivalent of 8,000 to 18,000, preferably 9,000 to 14,000 has the advantage that the resulting coating composition is remarkable in amenability to roll coating.

The aromatic epoxy resin (A) has a number average molecular weight of preferably about 1,400 to about 10,000, more preferably about 2,900 to about 9,000 in view of the applicability to retorting and viscosity.

Examples of the carboxyl-containing acrylic resin (B) which can be used in the esterification reaction include acrylic resins prepared by copolymerizing at least one member selected from the group consisting of carboxyl-containing radically polymerizable unsaturated monomers (a) as shown below, optionally with at least one member selected from the group consisting of radically polymerizable unsaturated monomers (b) as shown below which are copolymerizable with the monomers (a):

(a) α,β-ethylenically unsaturated carboxylic acids including acrylic acid, methacrylic acid, maleic acid, itaconic acid, crotonic acid, etc.; and (b) (1) $C_{1-8}$ hydroxyalkyl esters of acrylic or methacrylic acids including 2-hydroxyethyl acrylate, 2-hydroxyethyl methacrylate, hydroxypropyl acrylate, hydroxypropyl methacrylate, etc.;

(2) $C_{1-24}$ alkyl or cycloalkyl esters of acrylic or methacrylic acids including methyl acrylate, methyl methacrylate, ethyl acrylate, ethyl methacrylate, n-butyl acrylate, n-butyl methacrylate, isobutyl acrylate, isobutyl methacrylate, tert-butyl acrylate, tert-butyl methacrylate, cyclohexyl acrylate, cyclohexyl methacrylate, 2-ethylhexyl acrylate, 2-ethylhexyl methacrylate, lauryl acrylate, lauryl methacrylate, stearyl acrylate, stearyl methacrylate, decyl acrylate, etc.;

(3) functional acrylamides or methacrylamides including acrylamide, methacrylamide, N-methylacrylamide, N-ethylmethacrylamide, diacetonacrylamide, N-methylolacrylamide, N-methylolmethacrylamide, N-methoxymethyl acrylamide, N-butoxymethyl acrylamide, etc.;

(4) aromatic vinyl monomers including styrene, vinyltoluene, α-methylstyrene, etc.; and (5) vinyl monomers such as vinyl propionate, vinyl acetate, acrylonitrile, methacrylonitrile, vinyl pivalate, Veova monomers (product of Shell Chemical Co., Ltd.), etc.

Preferred combinations of the above unsaturated monomers are (i) methyl methacrylate/2-ethylhexyl acrylate/acrylic acid, (ii) styrene/methyl methacrylate/ethyl acrylate/methacrylic acid, (iii) styrene/ethyl acrylate/methacrylic acid, (iv) methyl methacrylate/ethyl acrylate/acrylic acid, etc.

These carboxyl-containing acrylic resins (B) can be easily prepared, for example, by subjecting the above-mentioned unsaturated monomers to solution polymerization in the presence of a radical polymerization initiator.

The carboxyl-containing acrylic resin (B) has a number average molecular weight of about 1,500 to about 100,000, preferably about 2,000 to about 20,000, and an acid value, preferably a high acid value, of about 50 to about 500 mgKOH/g, preferably about 200 to about 400 mgKOH/g.

There is no specific limitation on the solid concentrations of the aromatic epoxy resin (A) and the carboxyl-containing acrylic resin (B) to be used in the ester addition reaction (I). The solid concentration ranges corresponding to the optimum viscosity of these resins are preferred. The esterification catalyst such as tertiary amine, ammonia, etc. is used in an amount of 0.1 to 1 equivalent relative to the epoxy group of the aromatic epoxy resin.

The ester addition reaction can be conducted by the conventional method, as by homogeneously mixing a solution of the aromatic epoxy resin (A) in an organic solvent with a solution of the carboxyl-containing acrylic resin (B) in an organic solvent and reacting the homogeneous mixture in the presence of an esterification catalyst at a temperature of about 60° to about 130° C. for about 1 to about 6 hours until substantially complete consumption of the epoxy group.

A ratio of the epoxy resin (A) to the acrylic resin (B) to be used in the ester addition reaction can be suitably selected according to the amenability to coating operation and the properties of the coating. A suitable ratio by weight of the former to the latter, calculated as solids, is approximately 95:5 to 50:50, preferably 90:10 to 65:35.

Radically polymerizable unsaturated monomers which can be used in preparing a graft reaction product of the aromatic epoxy resin (A) and the carboxyl-containing acrylic resin (B) by the graft polymerization (II) include the radically polymerizable unsaturated monomers (a) and (b)

which can be used in the preparation of the carboxyl-containing acrylic resin (B) for use in the ester addition reaction (I).

There is no specific limitation on the ratio of the aromatic epoxy resin to the radically polymerizable unsaturated monomer to be used in the graft polymerization. A suitable ratio by weight of the former to the latter, calculated as solids, is approximately 95:5 to 50:50, preferably 90:10 to 65:35. In this case, the carboxyl-containing radically polymerizable unsaturated monomer is used in an amount of 20 to 80% by weight of the total amount of radically polymerizable monomers. The radical generating agent is used in an amount of 3 to 15% by weight based on the radically polymerizable unsaturated monomer.

Examples of useful radical generating agents are benzoyl peroxide, di-t-butyl hydroperoxide, t-butyl hydroperoxide, cumyl peroxide, cumene hydroperoxide, diisopropyl benzene hydroperoxide, t-butyl peroxybenzoate, lauroyl peroxide, acetyl peroxide, t-butyl peroxy-2-ethyl hexanoate and like peroxides, $\alpha,\alpha'$-azobisisobutyronitrile, azobisdimethylvaleronitrile, azobiscyclohexane carbonitrile and like azo compounds, etc.

The graft polymerization can be carried out by the conventional method, for example, by a method comprising homogeneously mixing the radically polymerizable unsaturated monomer with a radical generating agent, adding, over a period of 1 to 3 hours, the homogeneous mixture to an organic solvent solution of the aromatic epoxy resin (A) heated to 80° to 150° C. and maintaining the resulting mixture at the same temperature for 1 to 3 hours.

Organic solvents useful in the ester addition reaction (I) and the graft polymerization (II) can be any of conventional organic solvents insofar as the solvents are capable of dissolving the aromatic epoxy resin (A) and the carboxyl-containing acrylic resin (B) and the solvents are miscible with water and do not inhibit the formation of an emulsion in diluting with water the carboxylate of the graft reaction product of these resins.

Typical examples of such organic solvents are isopropanol, butyl alcohol, 2-hydroxy-4-methyl pentane, 2-ethylhexyl alcohol, cyclohexanol, ethylene glycol, diethylene glycol, 1,3-butylene glycol, ethylene glycol monoethyl ether, ethylene glycol monobutyl ether, diethylene glycol monomethyl ether and like alcohol solvents, Cellosolve solvents, carbitol solvents, acetone, etc. Water-immiscible inert organic solvents are also usable conjointly with the above-mentioned organic solvents. Such solvents include, for example, toluene, xylene and like aromatic hydrocarbons, ethyl acetate, butyl acetate and like esters, methyl ethyl ketone and like ketones.

The thus obtained graft reaction product of the aromatic epoxy resin (A) and the carboxyl-containing acrylic resin (B) has a number average molecular weight of about 2,000 to about 200,000, preferably about 4,000 to about 100,000 and an acid value of about 10 to about 120 mgKOH/g, preferably about 30 to about 120 mgKOH/g. It is desirable that the graft reaction product be substantially free of an epoxy group.

The graft reaction product of the aromatic epoxy resin (A) and the carboxyl-containing acrylic resin (B) can be made dispersible in water by neutralizing at least some of carboxyl groups in the resin with a basic compound.

Basic compounds useful in neutralizing some of carboxyl groups can be selected from a broad range of conventional compounds usable in the neutralization of carboxyl groups. Examples of such basic compounds are primary, secondary and tertiary amines, quaternary ammonium salts, ammonia, etc. More specific examples are methylamine, ethylamine, n-propylamine, isopropylamine, n-hexylamine, monoethanolamine, propanolamine, benzylamine, dimethylamine, dibutylamine, dihexylamine, methylethanolamine, diethanolamine, triethylamine, diethylethanolamine, dimethylcyclohexylamine, triethanolamine, tributylamine, dimethyl-n-butylamine, tripropylamine, γ-picoline, tetrahexylammonium hydroxide, ammonia, etc. Among them, tertiary amine, ammonia, etc. are preferred. The amount of such neutralizing agent to be used is 0.1 to 2 in the neutralization equivalent relative to the carboxyl group(s) in the reaction product. The neutralization with the neutralizing agent can be performed also in the conventional manner.

When the water-dispersible resin in the aqueous coating composition of the invention has a crosslinkable functional group such as a hydroxyl group, the composition may contain a crosslinking agent reactive with the crosslinkable functional group to enhance the curability of the composition. For example, the water-dispersible resin which is the graft reaction product of the aromatic epoxy resin (A) and the carboxyl-containing acrylic resin (B) has a hydroxyl group, a carboxyl group and the like as the crosslinkable functional group. In this case, a phenolic resin, amino resin or the like can be used as the crosslinking agent.

Useful phenolic resins include resol type phenolic resins prepared by condensing a phenol compound such as phenol, bisphenol A or the like with a formaldehyde in the presence of a catalyst to introduce a methylol group.

Examples of amino resins useful herein include methylolated amino resins prepared by reacting an aldehyde with an amino component such as melamine, urea, benzoguanamine, spiroguanamine, dicyandiamide or the like. Useful aldehydes are formaldehyde, paraformaldehyde, acetoaldehyde, benzaldehyde, etc. Useful amino resins include resins prepared by etherifying some of methylol groups of the methylolated amino resin using an alcohol such as methyl alcohol, ethyl alcohol, n-butyl alcohol, isobutyl alcohol or the like which have 1 to 8 carbon atoms.

The amount of the crosslinking agent to be used herein is preferably 1 to 40 parts by weight, more preferably 5 to 30 parts by weight, per 100 parts by weight of the water-dispersible resin.

The aqueous coating composition of the invention has the water-dispersible resin as a vehicle component and the ester of the polyglycerin ether with the fatty acid as dissolved or dispersed therein.

The polyglycerin ether used for the ester is prepared by etherifying a glycerin and has at least 2, preferably at least 6 hydroxyl groups. The polymerization degree of the polyglycerin ether is preferably 4 to 12.

Preferred fatty acids are saturated or unsaturated fatty acids having 8 to 18 carbon atoms, such as caprylic acid, lauric acid, oleic acid, myristic acid, palmitic acid, stearic acid, etc. The ester of the polyglycerin ether with the fatty acid can be prepared by the conventional esterification reaction.

The ester of the polyglycerin ether with the fatty acid is preferably a compound represented by the formula

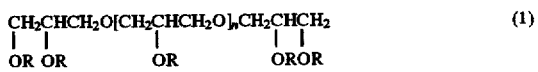

(1)

wherein R is a hydrogen atom or an acyl group represented by $R^1OC-$ (wherein $R^1$ is an alkyl group or an alkenyl group each having 8 to 18 carbon atoms), provided that at least ⅓ of the R groups is an acyl group, and n is an integer of 2 to 10.

The composition of the invention is excellent in the lubricity and processability of the coating and in the antifoaming property of the composition. The reason for the superiority in these properties may be as follows. The lubricity may be attributable to the long-chain hydrocarbon existing as the fatty acid residue in the ester of the polyglycerin ether with the fatty acid of the composition. The ester of the fatty acid has an ether linkage in the molecule and is thereby rendered surface-active and presumably effective in suppressing bubbles due to the surface activity. When the ester of the fatty acid has a hydroxyl group, the hydroxyl group is reacted, during the drying of the coating, with the functional group in the resin as a vehicle component, e.g. carboxyl group or with the functional group in the crosslinking agent, e.g. methylol group, and is thereby bonded thereto, so that the ester of the fatty acid which is a soft component is fixed in the coating to thereby plasticize the coating, contributing to the improvement of processability. In lining cans or the like with the composition, the hydroxyl-containing ester fixed in the coating is unlikely to dissolve out from the coating on exposure to hot water in a sterilization process.

A hydroxyl-free ester fixed in the coating, due to its low hydrophilicity, scarcely dissolves out from the coating by exposure to hot water in a sterilization process.

The content of the ester in the composition is not critical, usually in the range of 0.1 to 20% by weight, preferably 0.5 to 5% by weight, based on the solid content of the composition.

The ester can be dissolved or dispersed in the composition by various methods, for example, by mixing, with stirring, the ester or an aqueous solution or dispersion of the ester with an aqueous solution of the resin, optionally together with additives for the composition, or by melting the ester in the liquid resin heated to above the melting point of the ester, usually 40° to 100° C., before making the resin aqueous, uniformly stirring the mixture, and gradually adding a neutralizing agent and water to obtain an aqueous dispersion, optionally followed by mixing with additives and stirring.

The composition of the invention may contain any of pigments, dyes, waxes, anticoagulants, leveling agents, defoaming agents, etc. in addition to essentially the water-dispersible resin, fatty acid ester, and water and optionally the neutralizing agent and the crosslinking agent.

The solid concentration of the aqueous coating composition of the invention is not critical, usually in the range of 20 to 45% by weight.

The aqueous coating composition of the invention can be applied to substrates of metals such as tin, aluminum, tin-free steel, iron, zinc, copper, zinc-plated steel sheets, alloy-plated steel sheets, these metals treated by chemical conversion with a phosphate or chromate, wood, plastics, concrete or the like. The thickness of the coating can be suitably selected depending on the intended application, and is usually in the range of about 3 to about 20 µm. The coating composition of the invention can be applied to the substrate by roll coating, spray coating, brushing, roller coating, etc.

The conditions for drying the deposited composition can be suitably selected depending on the kind of resins to be used. If the resin is a mixture or a graft reaction product of an aromatic epoxy resin and an acrylic resin of high acid value, or a combination of the mixture or the graft reaction product with a phenolic resin or an amino resin, the deposited composition is baked at about 120° to about 250° C. for about 10 seconds to about 30 minutes.

The aqueous coating composition of the invention, when used for coating the interior of cans, is applied to substrates of metals such as tin, aluminum, tin-free steel or the like to give a coating with a dry thickness of about 3 to about 8 µm.

The aqueous coating composition of the invention, because of the ester of the polyglycerin ether with the fatty acid present therein, is satisfactory in the properties of the coating such as lubricity, processability, appearance, etc. and is free from problems on antifoaming property, stability, etc. The composition of the invention is superior in the lubricity and processability of the coating, and is, therefore, particularly useful in coating a can which requires rigorous processing conditions. The composition of the invention is also outstanding in the antifoaming and defoaming properties.

The present invention will be described below in more detail with reference to the following Examples and Comparative Examples. The percentages and parts used in the following description are all by weight unless specifically indicated.

Preparation of carboxyl-containing acrylic resin solution

Preparation Example 1

A 400-part quantity of n-butanol was charged into a 4-necked flask equipped with a stirrer, reflux condenser, thermometer, dropping funnel and nitrogen inlet. Into a beaker were placed 174 parts of methacrylic acid, 87 parts of styrene, 29 parts of ethyl acrylate and 14.5 parts of aqueous benzoyl peroxide (75% benzoyl peroxide and 25% water). The mixture was fully stirred to give a premixture.

The n-butanol in the flask was heated to a temperature of 105° C. The premixture was added dropwise to the n-butanol at the same temperature over a period of 3 hours through the dropping funnel. The resulting mixture was maintained at the same temperature for a further 2 hours to complete the copolymerization reaction. To the reaction product was added 290 parts of 2-butoxy ethanol, giving a solution of a carboxyl-containing acrylic resin having a viscosity of 370 cps and a solid content of 30% (hereinafter referred to as "acrylic resin solution A-1"). The carboxyl-containing acrylic resin thus obtained had an acid value of 390 mgKOH/g and a number average molecular weight of 14,000.

Preparation Example 2

| (1) Methoxypropanol | 580 parts |
| (2) Methacrylic acid | 160 parts |
| (3) Styrene | 232 parts |
| (4) Ethyl acrylate | 8 parts |
| (5) Benzoyl peroxide | 20 parts |

A 20% portion of a mixture of the above-mentioned components (2) to (5) and 580 parts of the component (1) were charged into a 4-necked flask equipped with a reflux condenser, thermometer, monomer flow controller, nitrogen inlet and stirrer. The mixture was heated to 95° C. in a nitrogen stream, and the remaining portion of the mixture of the components (2) to (5) was added dropwise over 3 hours. After the addition, the mixture was stirred for 2 hours at the same temperature and cooled to room temperature, giving a solution of a carboxyl-containing acrylic resin having a solid content of about 41% (hereinafter referred to as "acrylic resin solution A-2"). The carboxyl-containing acrylic resin thus obtained had an acid value of 216 mgKOH/g and a number average molecular weight of about 7,800.

Preparation of epoxy resin solution

Preparation Example 3

Into a reactor were placed 505 parts of an epoxy resin ("Epikote 828," a product of Yuka Shell Epoxy Co., Ltd., about 190 in epoxy equivalent, 130 poises in viscosity, 25° C.), 286 parts of bisphenol A, 0.5 part of tri-n-butylamine and 88 parts of methyl isobutyl ketone. The mixture was heated to 135° C. in a nitrogen stream, thereby evolving heat to 180° C. The mixture was cooled to 160° C. to undergo a reaction for about 3 hours, giving a 90% solution of an epoxy resin having a viscosity of $Z_4$ (Gardner-Holdt viscosity of a 40% butyl carbitol solution of the resin at 25° C.) (the solution being hereinafter referred to as "epoxy resin solution B"). The aromatic epoxy resin thus obtained had an epoxy equivalent of 4,000 and a number average molecular weight of 4,000.

Preparation Example 4

Into a reactor were placed 462 parts of an epoxy resin ("Epikote 807," a product of Yuka Shell Epoxy Co., Ltd., about 170 in epoxy equivalent, about 130 poises in viscosity, 25° C.), 274 parts of bisphenol F, 0.5 part of tri-n-butylamine and 82 parts of methyl isobutyl ketone. The mixture was heated to 135° C. in a nitrogen stream, thereby evolving heat to 180° C. The mixture was cooled to 160° C. to undergo a reaction for about 3 hours, giving a 90% solution of an epoxy resin having a viscosity of $Z_2$ (Gardner-Holdt viscosity of a 40% butyl carbitol solution of the resin at 25° C.) (which is hereinafter referred to as "epoxy resin solution C"). The aromatic epoxy resin thus obtained had an epoxy equivalent of 4,170 and a number average molecular weight of 4,200.

Preparation Example 5

| (1) Epikote 828 EL | 1,000 parts |
| (2) bis (4-Hydroxyphenyl)-methane | 551 parts |
| (3) Tetraethylammonium bromide | 0.2 part |

The above-mentioned components (1) to (3) were charged into a 4-necked flask equipped with a reflux condenser, thermometer, nitrogen inlet and stirrer. The mixture was reacted at 140° C. in a nitrogen stream. Monitoring the epoxy equivalent and the 40% solution viscosity (Gardner-Holdt viscosity of 40% butyl carbitol solution of the resin at 25° C.), the reaction continued for about 4 hours, giving a solid epoxy resin having a 40% solution viscosity of $Z_4$ (hereinafter referred to as "epoxy resin D"). The aromatic epoxy resin thus obtained had an epoxy equivalent of 10,000 and a number average molecular weight of 7,800.
Preparation of phenolic resin solution Preparation Example 6

Into a reactor equipped with a stirrer and a reflux condenser were placed 228 parts of bisphenol A, 122 parts of a 37% aqueous solution of formaldehyde and 2 parts of sodium hydroxide. The mixture was heated to 60° C. to undergo a reaction for 3 hours. To the reaction mixture were added 2.45 parts of sulfuric acid and 228 parts of n-butanol. The mixture was heated under a reduced pressure of 650 mmHg to perform azeotropic distillation for dehydration. The distillation was continued until the concentration was reduced to 80%. Then, the mixture was diluted to a concentration of 60% with n-butanol, giving a solution of a phenolic resin (hereinafter referred to as "phenolic resin solution E"). The phenolic resin thus obtained contained 60% of monomethylol compound and 30% of dimethylol compound and had an average of 1.2 methylol groups per molecule of bisphenol A.

Preparation Example 7

Into a reactor equipped with a stirrer and a reflux condenser were placed 228 parts of bisphenol A, 216 parts of a 37% aqueous solution of formaldehyde and 2 parts of sodium hydroxide. The mixture was heated to 100° C. to undergo a reaction for 4 hours. To the reaction mixture were added 2.45 parts of sulfuric acid and 228 parts of n-butanol. The mixture was heated under a reduced pressure of 650 mmHg to perform azeotropic distillation for dehydration. The distillation was continued until the concentration was reduced to 80%. Then the mixture was diluted to a concentration of 60% with n-butanol, giving a solution of a phenolic resin (hereinafter referred to as "phenolic resin solution F"). The phenolic resin thus obtained had an average of 1.8 methylol groups per molecule of bisphenol A.
Preparation of aqueous coating composition

EXAMPLE 1

The following components were used.

| (1) Acrylic resin solution A-1 | 150 parts |
| (2) Epoxy resin solution B | 283 parts |
| (3) n-Butanol | 86 parts |
| (4) 2-Butoxyethanol | 47 parts |
| (5) Deionized water | 3.2 parts |
| (6) Dimethylaminoethanol | 5.3 parts |
| (7) Dimethylaminoethanol | 9.5 parts |
| (8) Phenolic resin solution E | 150 parts |
| (9) Deionized water | 466 parts |
| Total | 1,200 parts |

The above-mentioned components (1) to (4) were placed into a reactor and heated to 115° C. in a nitrogen stream to dissolve the resin component. Then the solution was cooled to 105° C. The components (5) and (6) were added in this order. The mixture was maintained at 105° C. for 3 hours, giving a reaction product having an acrylic resin/epoxy resin solid ratio by weight of 15:85. Monitoring the acid value, it was found that the acid value reached 51 mgKOH/g when the reaction was terminated. Then, the component (7) and, 5 minutes later, the component (8) were added. The mixture was blended at 105° C. for 30 minutes. The component (9) was added over 30 minutes to disperse the mixture in water, giving an aqueous dispersion of a graft resin.

An ester was prepared from a hexaglycerin ether (having a polymerization degree of 6 and 8 hydroxyl groups per molecule) and lauric acid in a 1:6 molar ratio of the former to the latter (hereinafter called "ester G"). Ten parts of the ester G was gradually added to the above-obtained dispersion maintained at 60° C. with stirring to provide a stable aqueous coating composition having a solid content of about 33%.

The ester G is a compound of the formula (1) wherein among a total of 8 R groups, 6 R groups are acyl groups (lauroyl groups) on an average, and 2 R groups are hydrogen atoms on an average, and n is 4.

EXAMPLE 2

The procedure of Example 1 was repeated with the exception of using the same amount of phenolic resin solution F in place of phenolic resin solution E, giving an aqueous coating composition.

EXAMPLE 3

The procedure of Example 1 was repeated with the exception of using the same amount of epoxy resin solution C in place of epoxy resin solution B, giving an aqueous coating composition.

EXAMPLE 4

The following components were used.

| (1) Epoxy resin solution B | 283 parts |
| --- | --- |
| (2) n-Butanol | 121 parts |
| (3) 2-Butoxyethanol | 117 parts |
| (4) Methacrylic acid | 27 parts |
| (5) styrene | 13.5 parts |
| (6) Ethyl acrylate | 4.5 parts |
| (7) Benzoyl peroxide | 3 parts |
| (8) Dimethylaminoethanol | 14.8 parts |
| (9) Phenolic resin solution E | 150 parts |
| (10) Deionized water | 466.2 parts |
| Total | 1,200 parts |

The above-mentioned components (1) to (3) were placed into a reactor and heated to 115° C. in a nitrogen stream to dissolve the resin component. Then a mixture of the components (4) to (7) was added dropwise over 1 hour after which the mixture was reacted at 115° C. for 2 hours. The reaction mixture was cooled to 105° C. The component (8) and, 5 minutes later, the component (9) were added. The mixture was blended at 105° C. for 30 minutes. The mixture was cooled to 80° C., the component (10) was gradually added with stirring over 30 minutes while maintaining the temperature at 80° C., giving a dispersion of a graft resin.

The obtained dispersion was maintained at 60° C. after which 10 parts of the ester G used in Example 1 was gradually added to provide a stable aqueous coating composition having a solid content of about 33%.

EXAMPLE 5

The procedure of Example 1 was repeated with the exception of using an ester prepared from a decaglycerin ether (having a polymerization degree of 10 and 12 hydroxyl groups per molecule) and lauric acid in a 1:10 molar ratio of the former to the latter (hereinafter called "ester H") in place of the ester G used in Example 1 to provide a stable aqueous coating composition having a solid content of about 33%.

The ester H is a compound of the formula (1) wherein among a total of 12 R groups, 10 R groups are acyl groups (lauroyl groups) on an average, and 2 R groups are hydrogen atoms on an average, and n is 8.

EXAMPLE 6

The procedure of Example 1 was repeated with the exception of using an ester prepared from a hexaglycerin ether (having a polymerization degree of 6 and 8 hydroxyl groups per molecule) and stearic acid in a 1:8 molar ratio of the former to the latter (hereinafter called "ester I") in place of the ester G used in Example 1 to provide a stable aqueous coating composition having a solid content of about 33%.

The ester I is a compound of the formula (1) wherein among a total of 8 R groups, all of 8 R groups are acyl groups (stearoyl groups), and n is 4.

EXAMPLE 7

The procedure of Example 1 was repeated with the exception of using an ester prepared from a decaglycerin ether (having a polymerization degree 10 and 12 hydroxyl groups per molecule) and lauric acid in a 1:8 molar ratio of the former to the latter (hereinafter called "ester J") in place of the ester G used in Example 1 to provide a stable aqueous coating composition having a solid content of about 33%.

The ester J is a compound of the formula (1) wherein among a total of 12 R groups, 8 R groups are acyl groups (lauroyl groups) on an average and 4 R groups are hydrogen atoms on an average, and n is 8.

EXAMPLE 8

The procedure of Example 1 was repeated with the exception of using deionized water (component (9)) in an amount of 442 parts and the ester G in an amount of 2 parts (changed from 10 parts), producing a stable aqueous coating composition having a solid content of about 33%.

EXAMPLE 9

| (1) Acrylic resin solution A-2 | 50 parts |
| --- | --- |
| (2) Epoxy resin D | 80 parts |
| (3) Methoxypropanol | 69.8 parts |
| (4) Dimethylethanolamine | 0.2 part |
| (5) Aqueous solution of ammonia (conc. 25%) | 7.6 parts |
| (6) Deionized water | 192.4 parts |

The above-mentioned components (1) to (3) were charged into a 4-necked flask equipped with a reflux condenser, thermometer and stirrer. The mixture was heated to 100° C. to obtain a solution. After the addition of the component (4), a reaction was conducted for 6 hours while maintaining the temperature at 100° C., giving a solution of a graft reaction product of the acrylic resin with the epoxy resin. The reaction was confirmed by monitoring the acid value of the resin. The obtained graft resin had an acid value of 49 mgKOH/g and a number average molecular weight of about 8,900.

The resin solution obtained above was adjusted to 60° C. The component (5) was added to neutralize the resin after which the component (6) was gradually added to disperse the mixture in water. The excess solvent was removed by vacuum distillation, giving an emulsion of an acryl-modified epoxy resin. The emulsion had a solid content of 40.2%.

While maintaining the emulsion at 60° C., 3 parts of ester G was gradually added, followed by the addition of deionized water, giving a stable aqueous coating composition having a solid content of about 33%.

Comparative Example 1

The procedure of Example 1 was followed with the exception of changing the amount of deionized water (component (9)) from 466 parts to 436 parts without using the ester G, giving an aqueous coating composition having a solid content of about 33%.

Comparative Example 2

The procedure of Example 4 was followed with the exception of changing the amount of deionized water (component (10)) from 466.2 parts to 436.2 parts without using the ester G, giving an aqueous coating composition having a solid content of about 33%.

Comparative Example 3

The procedure of Example 9 was followed with the exception of not using the ester G, giving an aqueous coating composition having a solid content of about 33%.

The aqueous coating compositions prepared in Examples and Comparative Examples were tested for the properties of the coating including the adhesion, lubricity, processability, chloroform extraction, resistance to boiling water, flavor quality of extract with water and consumption of potassium permanganate, and the properties of the coating composition including the stability with time and antifoaming property. The tests were carried out by the following methods.

Test methods

Production of coated panel (test panel) and coated foil (test foil)

The coating composition was applied to an aluminum panel of 0.3 mm in thickness by a bar coater in an amount to give a dry coating weight of 120 mg/100 cm². The coated panel was set at 100° C. for 2 minutes and baked by a dryer for 30 seconds under baking conditions: an atmosphere temperature of 280° C. and a wind speed of 25 m/min so as to expose the coating to a maximum temperature of 260° C. The obtained test panels were tested for the adhesion, lubricity, processability, chloroform extraction and resistance to boiling water. The coating compositions were applied to an aluminum foil of 0.1 mm in thickness (used in place of the aluminum panel of 0.3 mm in thickness). The coated foil was set and baked in the same manner as done for the aluminum panel with the exception of adjusting the dryer to an atmosphere temperature of 275° C. The test foils thus obtained were tested for the flavor quality of extract with water and consumption of potassium permanganate.

Adhesion

The test panel was crosswise cut to the substrate to make 11 parallel cuts widthwise and lengthwise with spacing of about 1.5 mm to obtain 100 squares. Cellophane adhesive tape 24 mm wide was applied over the cut and peeled off. The adhesion was assessed qualitatively on A to C scale.
(A) No peeling
(B) Slightly peeled
(C) Significantly peeled Lubricity Using EGAN SLIP TESTER (product of Thwing Albert Instrument Company, U.S.A.) at 20° C., the coefficient of dynamic friction was measured using a weight of 3 kg (the weight being of the type wherein three steel balls are in contact at three points) which was disposed on the test panel and adapted to move at a speed of 10 cm/m.

Processability

Using a folding type Dupon impact tester, the test panel was folded in two at its end part, and two aluminum panels of 0.3 mm in thickness were held between the folded parts of the test panel. Then the test panel in this state was set on the tester. A 3 kg weight of iron having a flat contact surface was dropped from a height of 50 cm onto the folded parts to give impact. Thereafter an electric current was passed through the folded parts at 6.5 V for 6 seconds. The current value (mA) in the folded parts (20 mm wide) was measured. The results were assessed on A to D scale.
A: Less than 1 mA
B: At least 1 mA but less than 5 mA
C: At least 5 mA but less than 10 mA
D: At least 10 mA Chloroform extraction The test panel was cut to an area measuring 10×10 cm. Chloroform was used in an amount which corresponded to an area/chloroform proportion of 1 cm²/1 cc. The square test panel was immersed in boiling chloroform and treated with boiling chloroform for 1 hour for extraction. The amount of extracted coating was expressed in percent by weight.

Resistance to boiling water

The test panel was immersed in boiling water at 100° C. for 30 minutes. Thereafter, the test panel was inspected to evaluate the appearance. The panel free of abnormality such as blistering and blushing was rated as A. The panel was also assessed according to the same criteria as in the adhesion test.

Flavor quality of extract with water

The test aluminum foil of 0.1 mm thick was placed in a heat-resistant glass bottle filled with tap water treated with activated carbon in an amount of 1 cc per cm² of test foil. The opening of the bottle was hermetically closed with a cap and a sterilization treatment was conducted at 125° C. for 30 minutes. The extract with water was checked for the flavor quality and evaluated on A to C scale.
A: No change
B: Slightly changed
C: Markedly changed Consumption of potassium permanganate The extract with water obtained in the flavor quality test was checked according to the test method described in the Food Sanitation Act (Act No. 434 of Welfare Ministry). The consumption of potassium permanganate was expressed in ppm.

Stability of coating composition

The aqueous coating composition (100 ml) was placed in a 100 ml glass bottle with a wide mouth. The bottle was hermetically closed and was stored in a thermostatic container at 50° C. for 1 month. Then, the composition was taken out from the bottle, examined for skinning on the liquid surface and measured in respect of a viscosity and an average particle size of dispersed particles. The change, as a whole, of the composition was evaluated according to the following criteria on A to C scale as compared with the composition before storing.
A: Substantially no change
B: Slightly changed
C: Markedly changed Antifoaming property The aqueous coating composition (160 cc) was placed into a 1,000 cc measuring cylinder. The air was forced at a rate of 400 cc/min into the composition through a globular filter made of glass using an air pump. After the feed of air for 5 minutes, the amount of foams thus produced was measured and evaluated on A to C scale. The smaller the amount of foams was, the higher the antifoaming property was.
A: Less than 400 cc
B: At least 400 cc, but less than 800 cc
C: at least 800 cc The results are shown in Table 1.

TABLE 1

| | Example | | | | | |
|---|---|---|---|---|---|---|
| | 1 | 2 | 3 | 4 | 5 | 6 |
| Adhesion | A | A | A | A | A | A |
| Lubricity | 0.05 | 0.05 | 0.05 | 0.05 | 0.04 | 0.04 |
| Processability | A | A | A | A | A | B |
| Chloroform extraction (%) | 4.6 | 4.5 | 4.5 | 5.3 | 4.6 | 4.7 |
| Boiling water resistance | | | | | | |
| Coating appearance | A | A | A | A | A | A |
| Adhesion | A | A | A | A | A | A |
| Flavor quality of extract with water | A | A | A | A | A | A |

TABLE 1-continued

|  | | | | | | |
|---|---|---|---|---|---|---|
| Consumption of potassium permanganate (ppm) | 6.7 | 6.4 | 6.6 | 4.5 | 6.6 | 6.7 |
| Stability of coating composition | A | A | A | A | A | A |
| Antifoaming property | A | A | A | A | A | A |

|  | Example | | | Comparative Example | | |
|---|---|---|---|---|---|---|
|  | 7 | 8 | 9 | 1 | 2 | 3 |
| Adhesion | A | A | A | A | A | A |
| Lubricity | 0.06 | 0.12 | 0.07 | 0.43 | 0.40 | 0.21 |
| Processability | A | A | A | D | D | B |
| Chloroform extraction (%) | 4.6 | 4.5 | 4.2 | 4.6 | 5.3 | 4.1 |
| Boiling water resistance | | | | | | |
| Coating appearance | A | A | A | A | A | A |
| Adhesion | A | A | A | A | A | A |
| Flavor quality of extract with water | A | A | A | A | A | A |
| Consumption of potassium permanganate (ppm) | 6.6 | 6.5 | 4.6 | 6.5 | 4.5 | 4.3 |
| Stability of coating composition | A | A | A | A | A | A |
| Antifoaming property | A | A | A | C | C | C |

The aqueous coating compositions prepared in Example 9 and Comparative Example 3 were tested for the amenability to roll coating by the following method.

Amenability to roll coating

The aqueous coating compositions adjusted to about 85 seconds in a viscosity of Ford cup #4 were applied to a tin-free steel panel by a roll coater with natural coating method in an amount sufficient to give a coating having a dry thickness of 5 to 8 μm. Then the coated panel was baked at 200° C. for 10 minutes. The coating was evaluated in respect of the condition of coating surface such as the surface smoothness, gloss, build-up at the edge portion, sag, etc. and the state of the composition in the coater pan.

The composition of Example 9 was satisfactory in the condition of coating surface and in the state of the composition in the coater pan. The composition of Comparative Example 3 abounded in bubbles and suffered from numerous pinholes arising from the burst of bubbles.

What we claim is:

1. An aqueous coating composition comprising a water-dispersible resin and a fatty acid ester of a polyglycerin ether, wherein the water-dispersible resin is a graft reaction product of an epoxy resin with an acrylic resin prepared from an α,β-ethylenically unsaturated carboxylic acid and optionally another polymerizable unsaturated monomer which is copolymerizable with the α,β-ethylenically unsaturated carboxylic acid, the fatty acid is a saturated or unsaturated fatty acid having 8 to 18 carbon atoms, and the polyglycerin ether has at least two hydroxyl groups.

2. An aqueous coating composition according to claim 1, wherein the fatty acid ester is a compound of the formula

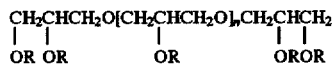

wherein R is H, or $COR^1$ wherein $R^1$ is a $C_{8-18}$ alkyl or alkenyl group, and wherein at least one third of the R's are $COR^1$; and n is an integer of 2 to 10.

3. An aqueous coating composition according to claim 1, wherein the water-dispersible resin is a graft reaction product of an aromatic epoxy resin with a copolymer of an α,α-ethylenically unsaturated carboxylic acid and a polymerizable unsaturated monomer.

4. An aqueous coating composition according to claim 3, wherein the aromatic epoxy resin has an epoxy equivalent of about 900 to about 22,000.

5. An aqueous coating composition according to claim 4, wherein the aromatic epoxy resin has an epoxy equivalent of about 8,000 to about 18,000.

6. An aqueous coating composition according to claim 3, wherein the copolymer has a number average molecular weight of about 1,500 to about 100,000 and an acid value of about 50 to about 500 mgKOH/g.

7. An aqueous coating composition according to claim 1, which additionally contains, as a crosslinking agent, a resol phenolic resin or an amino resin prepared by etherifying methylol groups of a methylolated amino resin with an alcohol.

8. An aqueous coating composition according to claim 1, which contains the 0.1 to 20% of the fatty acid ester based on the weight of the solids in the composition.

* * * * *